Sept. 11, 1951 — C. P. KRUPP — 2,567,773
HOSE COUPLING
Filed Dec. 18, 1947
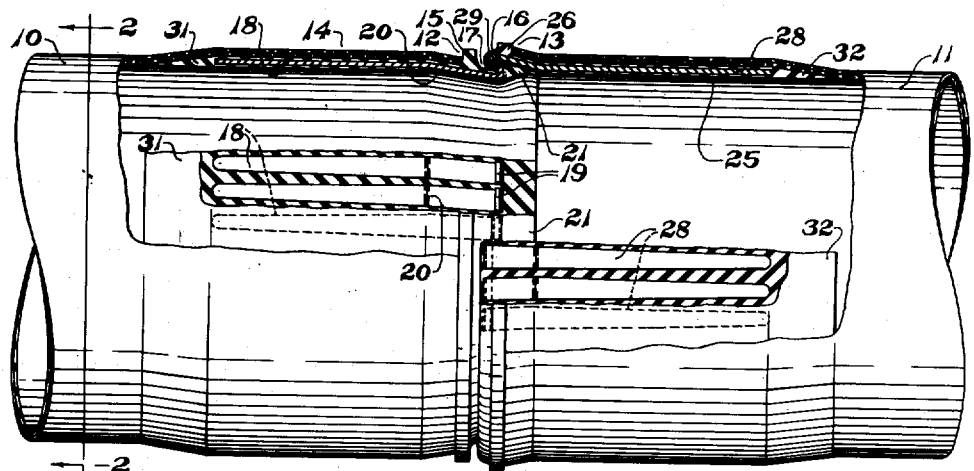
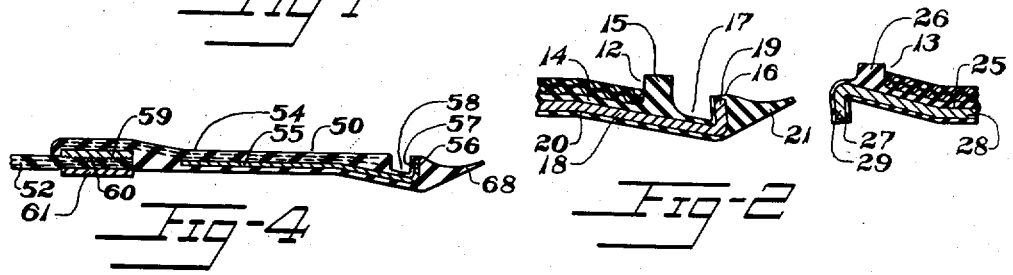
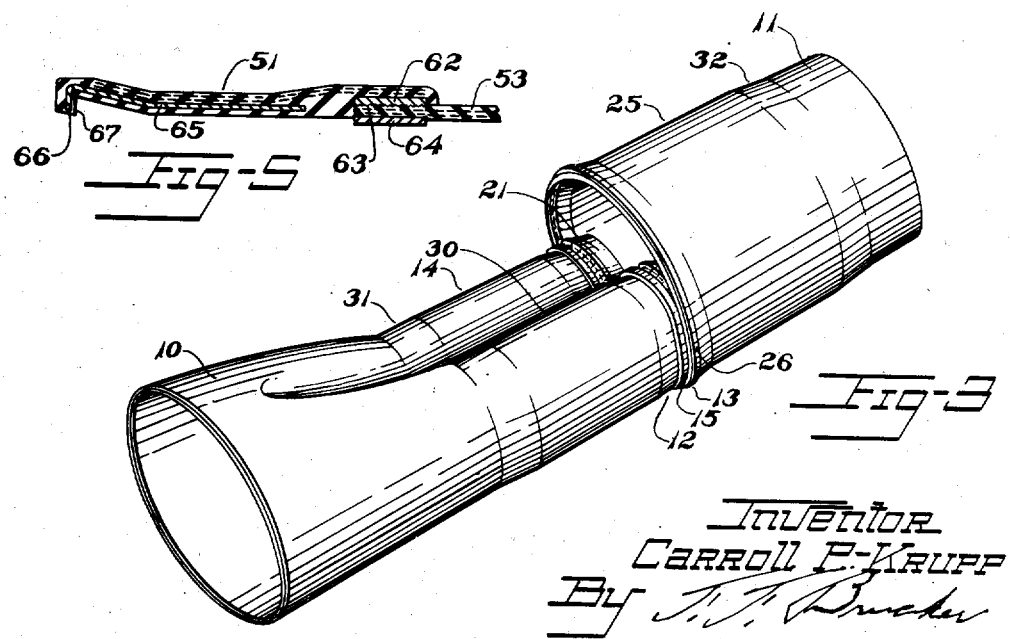
Inventor
Carroll P. Krupp Patented Sept. 11, 1951

2,567,773

UNITED STATES PATENT OFFICE 2,567,773

HOSE COUPLING

Carroll P. Krupp, Barberton, Ohio, assignor to The B. F. Goodrich Company, New York, N. Y., a corporation of New York Application December 18, 1947, Serial No. 792,531

15 Claims. (Cl. 285—71)

This invention relates to the coupling of flexible hose or tubing and is especially useful where quickly detachable and attachable coupling of hose sections is desired.

It is an object of the invention to provide quick detachability and attachability combined with lightness of weight and freedom from bulk.

Other objects are to provide tight sealing of the joint, to provide couplings not likely to be damaged due to flattening of the hose caused by vehicles passing thereover, to provide for strongly resisting line pull, to provide these results in a light, thin-walled structure, to provide a coupling adaptable to being built into the hose, to provide circumferential strength, and to provide simplicity of construction.

These and other objects will appear from the following description and the accompanying drawings.

Of the drawings,

Fig. 1 is a side elevation, partly in section, showing coupled ends of hose having couplings corresponding to and embodying the invention, Fig. 2 is an axial sectional view of the couplings in disengaged and relaxed condition, Fig. 3 is a perspective view showing the coupled tube ends with one end collapsed to permit insertion or withdrawal thereof with relation to the other member, Fig. 4 is a cross sectional view showing a modification of the male coupling, and Fig. 5 is a similar view showing the cooperating female coupling.

Referring to the drawings, the two hose sections are designated by the numerals 10, 11 and comprise tubular pliable bodies of rubber or other rubber-like material and fabric adapted to conduct fluids. Secured to the ends of the hose sections are coupling members 12, 13 shown as coupled in Fig. 1 and as uncoupled and to larger scale in Fig. 2.

The male coupling member 12 is in the form of an annular band or sleeve 14 of resilient rubber or other rubber-like material formed with outwardly directed shoulders 15, 16 defining an annular groove 17 therebetween. Embedded in the rubber-like material are a series of reinforcing elements 18, preferably stiff but resilient and may be metal springs, arranged axially of the coupling in spaced-apart relation about the band. Each element or spring is preferably bonded to the rubber-like material as by a bond of vulcanization and has an outwardly radially-bent end or finger 19 terminating in the flange 16 while that portion of the spring adjacent the bend is bent, as at 20, slightly inwardly of the coupling so as to slope toward the bent end or finger 19. The arrangement is such that the portion of each element or spring extending axially of the coupling is in alignment with a portion of the finger inwardly of its tip. The male coupling member also has beyond the fingers an angularly inclined lip-seal flange 21 of resilient rubber-like material adapted to engage the inner wall of the female coupling member under slight distortion when engaged therewith to maintain a seal whether the fluid pressure be low or high.

The female coupling member 13 is in the form of an annular band or sleeve 25 of rubber-like material formed with a radial outwardly-directed shoulder 26 and a terminal inwardly-directed shoulder 27 therebeyond. Embedded within the band 25 are a series of metal elements or springs 28 arranged axially of the band and in spaced-apart relation thereabout, each element or spring being bonded to the rubber-like material. The springs are similar to the springs 18 but are arranged with their fingers 29 turned inwardly so as to be embedded in the flange 27. The arrangement is such that the inwardly turned fingers 29 of the springs 28 will overlap the outwardly turned ends 19 of the springs 18 of the opposite coupling.

Each coupling member may be vulcanized to an end of a hose section for attachment thereto.

Coupling of the hose is accomplished by collapsing a portion of the wall of the male coupling member inwardly as shown at 30 in Fig. 3 and then entering it in the female coupling member and releasing the collapsing pressure. Due to the resilience of the rubber, the coupling member springs into coupling engagement, the single book-like shoulder of each section providing a strong attachment. The lip seal securely seals the joint, sealing with increased pressure as fluid pressure within the hose is increased. Upon release of fluid pressure within the hose, the hose may be uncoupled by collapsing one side of the male coupling member as illustrated in Fig. 3 and then separating the coupling members.

While it is preferred to make both coupling members of flexible resilient material, the female member may be of stiff relatively unyielding material, in which case the spring members 28 may be omitted but the coupling member may be made of the same shape as the resilient coupling member shown in the drawings.

The spring members 18, 28 being in circumferentially spaced-apart relation, while stiffening the coupling members in an axial direction, and reinforcing the shoulders 16, 27, permit limited circumferential expansion and contraction of the coupling members due to the stretchability of the rubber-like material therebetween. As the hose wall extends over the coupling members this limits stretchability of the coupling members to that permitted by the hose. The rubber-like material between the springs of the coupling members permits collapse of the male coupling member by reason of its flexibility.

The band portions of the coupling members are preferably tapered, chamfered or feathered, as at 31, 32 at their ends where they terminate against the inner wall of the hose so as to provide a substantially uniform bore. The band portions are vulcanized or cemented to the inner wall of the hose. Preferably, the coupling members are formed separately, as by molding them and are then attached to the hose sections.

The lip seal 21 being inclined outwardly contacts the inner wall of the female coupling member and provides a constant seal, the sealing pressure of which increases with increase of fluid pressure within the hose. This is true regardless of direction of flow of fluid within the hose.

Figs. 4 and 5 show a modification of the invention in which the male coupling member 50 and the cooperating female coupling member 51 are separately formed and attached to the hose 52 or 53 by being clamped thereto. The male coupling member has a sleeve portion 54 in which the metal spring elements 55 are embedded in circumferentially spaced apart relation with their outwardly bent ends 56 extending adjacent an annular shoulder 57 defining one side of an annular groove 58. A metal ring 59 is embedded in the sleeve at its hose-engaging end and may have ribs or teeth 60 for frictionally engaging the wall of the hose. A second metal ring 61 is expanded in the bore of the hose in alignment with the ring 59 to clamp the coupling to the hose.

The female coupling member 51 is similarly provided with a metal ring 62 embedded in its sleeve and having ribs or teeth 63 on its exposed inner face. An expanded ring 64 within the bore of the hose 53 clamps the hose wall between the rings. The female coupling member has metal spring elements 65 embedded therein in circumferentially spaced-apart relation and having inwardly bent ends 66 extending into a shoulder 67 adapted to engage shoulders 57 of the mold coupling member.

The male coupling member has a terminal lip seal 68 for sealing against the bore of the female coupling.

Variations may be made without departing from the scope of the invention as it is defined by the following claims.

I claim:

1. A hose coupling comprising a pair of tubular coupling members a member of which pair being a resilient flexible rubber-like material and being distortable by inwardly directed pressure applied locally of its circumference to permit entry into the bore of the other, said coupling members each having a radial shoulder for interlockingly engaging the other, the shoulder of the distortable member being outwardly directed and the shoulder of the other member being inwardly directed, and means in said distortable member comprising relatively stiff elements secured to said rubber-like material and extending into the shoulder thereof in circumferentially spaced relation one to another for stiffening it against axial displacement when engaged with the shoulder of the other member while distortability of the shoulder region of the member is maintained by virtue of the circumferentially spaced relation of said elements.

2. A hose coupling comprising a pair of tubular coupling members a member of which pair being of resilient flexible rubber-like material and being distortable by inwardly directed pressure applied locally of its circumference to permit entry into the bore of the other, said coupling members each having a radial shoulder for interlockingly engaging the other, the shoulder of the distortable member being outwardly directed and the shoulder of the other member being inwardly directed, means embedded in said distortable member comprising relatively stiff elements secured to said rubber-like material and extending into the shoulder thereof in circumferentially spaced relation one to another for stiffening it against axial displacement when engaged with the shoulder of the other member while distortability of the shoulder region of the member is maintained by virtue of the circumferentially spaced relation of said elements, and lip-sealing means on said distortable member for sealing engagement with the other member.

3. A house coupling comprising a pair of tubular coupling members a member of which pair being of resilient flexible rubber-like material and being distortable by inwardly directed pressure applied locally of its circumference to permit entry into the bore of the outer, said coupling members each having a radial shoulder for interlockingly engaging the other, the shoulder of the distortable member being outwardly directed and the shoulder of the other member being inwardly directed, and means in said distortable member comprising relatively stiff elements secured to said rubber-like material and extending axially throughout said member and into the shoulder thereof in circumferentially spaced relation one to another throughout their extent for stiffening said shoulder against axial displacement when engaged with the shoulder of the other member while distortability of the shoulder region of the member is maintained by virtue of the circumferentially spaced relation of said elements.

4. A hose coupling comprising a pair of tubular coupling members, a member of which pair being of resilient flexible rubber-like material and being distortable by inwardly directed pressure applied locally of its circumference to permit entry into the bore of the other, said coupling members each having a radial shoulder for interlockingly engaging the other, the shoulder of the distortable member being outwardly directed and the shoulder of the other member being inwardly directed, and means in said distortable member comprising relatively stiff metallic strip elements secured to said rubber-like material and extending axially throughout said member and into the shoulder thereof with bent up portions in said shoulder, said elements being arranged in circumferentially spaced relation one to another throughout their extent for stiffening said shoulder against axial displacement when engaged with the shoulder of the other member while distortability of the shoulder region of the member is maintained by virtue of the circumferentially spaced relation of said elements.

5. A hose coupling comprising a pair of tubular coupling members a member of which pair being of resilient flexible rubber-like material and being distortable by inwardly directed pressure pressure applied locally of its circumference to permit entry into the bore of the other, said coupling members each having a single radial shoulder for interlockingly engaging the other, the shoulder of the distortable member being outwardly directed and the shoulder of the other member being inwardly directed, means embedded in said distortable member and extending into the shoulder thereof for stiffening it against axial displacement when engaged with the shoulder of the other member, said stiffening means comprising independent metal leaf springs arranged axially of said tubular distortable coupling member in circumferentially spaced-apart relation.

6. A hose coupling comprising a pair of male and female tubular distortable coupling members, said members being of resilient flexible rubber-like material, said female member having a single inwardly-directed radial shoulder and said male member having an outwardly-directed radial shoulder for seating against said inwardly-directed shoulder and interlockingly engaging the coupling members with each other, said male member being distortable by radial inwardly-directed pressure applied locally of its circumference to permit entry and withdrawal from said female member, and relatively stiff metallic strip elements embedded in said members and extending axially throughout said members and into the shoulders thereof with bent up portions in said shoulders said elements being arranged in circumferentially spaced relation one to another throughout their extent for stiffening the shoulders against axial displacement when the shoulders are engaged with one another while distortability of the shoulder regions of the members are maintained by virtue of the circumferentially spaced relation of said elements.

7. A hose coupling comprising a pair of male and female tubular distortable coupling members, said members being of resilient flexible rubber-like material, said female member having a single inwardly-directed radial shoulder and said male member having an outwardly-directed radial shoulder for seating against said inwardly-directed shoulder and interlockingly engaging the coupling members with each other, said male member being distortable by radial inwardly-directed pressure applied locally of its circumference to permit entry and withdrawal from said female member, and elements embedded in said members and extending into their flanges for stiffening them against axial displacement, said elements comprising relatively stiff strips secured to said rubber-like material and arranged axially of said tubular members in circumferentially spaced relation one to another to stiffen said members while distortability of the shoulder regions of the members is maintained by virtue of the circumferentially spaced relation of said elements.

8. A hose coupling comprising a female coupling member having a sleeve portion attachable to a hose section having a radial inwardly-directed flange at its coupling end, a male coupling member of resilient flexible rubber-like material comprising a sleeve portion attachable to a second hose section, a radial outwardly-directed flange on said sleeve providing a shoulder for engaging a radial face of the inwardly-directed flange of the female coupling member, and spring elements embedded in the rubber-like material of the sleeve portion extending axially thereof in circumferentially spaced-apart relation and having radial outwardly-bent fingers extending into said flange thereof in axial alignment with the inwardly-directed flange of the female coupling member, said male coupling member being distortable by inwardly-directed pressure applied locally of its circumference to permit entry into the bore of the female coupling member.

9. A hose coupling comprising a female coupling member having a sleeve portion attachable to a hose section and having a radial inwardly-directed flange at its coupling end, a male coupling member of resilient flexible rubber-like material comprising a sleeve portion attachable to a second hose section, radial outwardly-directed flanges thereon providing therebetween a groove for receiving the inwardly-directed flange of the female coupling member, and spring elements embedded in the rubber-like material of the sleeve portion extending axially thereof in circumferentially spaced-apart relation and having radial outwardly-bent fingers extending into said flanges thereof in axial alignment with the inwardly-directed flange of the female coupling member, said male coupling member being distortable by inwardly directed pressure applied locally of its circumference to permit entry into the bore of the female coupling member.

10. A hose coupling comprising a female coupling member having a sleeve portion attachable to a hose section and having a radial inwardly-directed flange at its coupling end, a male coupling member of resilient flexible rubber-like material comprising a sleeve portion attachable to a second hose section, a radial outwardly-directed flange providing a shoulder for engaging a radial face of the inwardly-directed flange of the female coupling member, a lip-sealing portion on the flange of the male coupling member for sealing engagement with the bore of the female coupling member, and spring elements embedded in the rubber-like material of the sleeve portion extending axially thereof in circumferentially spaced-apart relation and having radial outwardly-bent ends extending into said flange thereof in axial alignment with the inwardly-directed flange of the female coupling member, said male coupling member being distortable by inwardly-directed pressure locally of its circumference to permit entry into the bore of the female coupling member.

11. A hose coupling comprising a female coupling member having a sleeve portion attachable to a hose section, and having a radial inwardly-directed flange at its coupling end, a male coupling member of resilient flexible rubber-like material comprising a sleeve portion attachable to a second hose section, radial outwardly-directed flanges thereon providing therebetween a groove for receiving the inwardly-directed flange of the female coupling member, a lip-sealing portion on the flange of the male coupling member for sealing engagement with the bore of the female coupling member, and metallic elements embedded in the rubber-like material of the sleeve portion extending axially thereof in circumferentially spaced-apart relation and having radial outwardly-bent ends extending into said flange thereof in axial alignment with the inwardly-directed flange of the female coupling member, said male coupling member being distortable by inwardly-directed pressure applied locally of its circumference to permit entry into the bore of the female coupling member.

12. A hose coupling comprising a female coupling member having a sleeve portion insertable in the bore of a hose section and having a radial inwardly-directed flange at its coupling end, a male coupling member of resilient flexible rubber-like material comprising a sleeve portion insertable in the bore of a second hose section, radial outwardly-directed flanges thereon defining therebetween a groove complemental to the inwardly directed flange of the female coupling member, a lip-sealing portion on the outermost flange of the male coupling member for sealing engagement with the bore of the female coupling member, and independent metal spring elements embedded in the ruber-like material of the sleeve portion extending axially thereof in circumferentially spaced-apart relation and having radial outwardly-bent ends extending into said flange thereof in axial alignment with the inwardly-directed flange of the female coupling member, said male coupling member being distortable by inwardly-directed pressure applied locally of its circumference to permit entry into the bore of the female coupling member.

13. A hose coupling member for coupling engagement with a tubular member having a radial inwardly-directed coupling flange and a bore therebeyond, said coupling member comprising a tubular sleeve of resilient flexible rubber-like material having a single outwardly-open circumferential groove for engagement with the flange of said tubular member, said coupling member being distortable by radial inwardly-directed force applied locally of its circumference to permit entry of said coupling member into engagement with said tubular member, and means in said tubular sleeve extending beyond said circumferential groove for stiffening it against axial displacement when engaged with said inwardly directed coupling flange, said means comprising relatively stiff elements secured to said rubber-like material in circumferentially spaced relation one to another for stiffening it against axial displacement when engaged with the inwardly directed coupling flange while distortability of the portion of the sleeve engaged beyond the flange is maintained by virtue of the circumferentially spaced relation of said elements.

14. A hose coupling comprising a female coupling member having a sleeve portion attachable to a hose section and having a radial inwardly-directed flange at its coupling end, a male coupling member of resilient flexible rubber-like material comprising a sleeve portion attachable to a second hose section, a radial outwardly-directed portion at the coupling end of the sleeve providing a shoulder for engaging a radial face of the inwardly directed flange of the female coupling member, and spring elements of metal embedded in the rubber-like material of the sleeve portion extending axially thereof in circumferentially spaced-apart relation thereabout and each having radial outwardly-bent fingers extending into said shoulder thereof in axial alignment with the inwardly-directed flange of the female coupling member, and an annular lip seal on said sleeve of the male coupling member axially beyond said shoulder thereof in a position to seal against the bore of the female coupling member, said male coupling member being distortable by inwardly directed pressure applied locally of its circumference to permit entry of said male coupling member into the bore of the female coupling member.

15. A hose coupling comprising a female coupling member of resilient rubber-like material having a flexible sleeve portion attachable to a hose section and having a radial inwardly-directed flange at its coupling end and a reinforcing hose engaging metal band at its hose-engaging end, a male coupling member of resilient flexible rubber-like material comprising a flexible sleeve portion attachable to a second hose section, a radial outwardly directed portion at the coupling end of the sleeve providing a shoulder for engaging a radial face of the inwardly-directed flange of the female coupling member, and a reinforcing hose engaging metal band at its hose enaging end, spring elements of metal embedded in the rubber-like material of the sleeve portions of the coupling members and having radially bent fingers extending into said flange of the female member and said radial outwardly directed portion of the male member respectively, said spring elements extending axially of the coupling members in circumferentially spaced apart relation, and an annular lip seal on the coupling end of the male coupling member in a position to seal against the bore of the female coupling member, said coupling members being adapted to be attached to the hose sections by being telescoped thereover and to be retained by expansible metal bands expanded in the hose sections at the positions of said metal reinforcing bands.

CARROLL P. KRUPP.

REFERENCES CITED

The following references are of record in the file of this patent:

UNITED STATES PATENTS

| Number | Name | Date |
| --- | --- | --- |
| 1,847,218 | Lamb | Mar. 1, 1932 |
| 2,003,918 | Brown | June 4, 1935 |
| 2,366,067 | Smith | Dec. 26, 1944 |

Certificate of Correction

Patent No. 2,567,773 September 11, 1951

CARROLL P. KRUPP

It is hereby certified that error appears in the printed specification of the above numbered patent requiring correction as follows:

Column 4, line 25, for "house" read *hose*; line 30, for "outer" read *other*; line 74, strike out "pressure";

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*